United States Patent
Zhang (10) Patent No.: US 11,507,144 B2
(45) Date of Patent: Nov. 22, 2022

(54) ROTATING SHAFT AND ELECTRONIC DEVICE HAVING ROTATING SHAFT

(71) Applicant: VIVO MOBILE COMMUNICATION CO., LTD., Guangdong (CN)

(72) Inventor: Xinfu Zhang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/186,241

(22) Filed: Feb. 26, 2021

(65) Prior Publication Data

US 2021/0181809 A1    Jun. 17, 2021

Related U.S. Application Data

(63) Continuation of application No. PCT/CN2019/099233, filed on Aug. 5, 2019.

(30) Foreign Application Priority Data

Aug. 29, 2018    (CN) .......................... 201810995662.5

(51) Int. Cl.
*G06F 1/16*    (2006.01)
(52) U.S. Cl.
CPC .......... *G06F 1/1681* (2013.01); *G06F 1/1616* (2013.01); *G06F 1/1652* (2013.01)
(58) Field of Classification Search
CPC ..... G06F 1/1616; G06F 1/1652; G06F 1/1681
See application file for complete search history.

(56) References Cited

U.S. PATENT DOCUMENTS

| 2008/0049391 A1 | 2/2008 | Shin |
| 2012/0002360 A1 | 1/2012 | Seo et al. |
| 2012/0044620 A1 | 2/2012 | Song et al. |
| 2013/0314611 A1 | 11/2013 | Okutsu et al. |
| 2015/0023031 A1 | 1/2015 | Endo |

(Continued)

FOREIGN PATENT DOCUMENTS

| CN | 203982278 U | 12/2014 |
| CN | 105578091 A | 5/2016 |

(Continued)

OTHER PUBLICATIONS

Extended European Search Report dated Sep. 28, 2021 as received in Application No. 19854552.7.

(Continued)

*Primary Examiner* — Anthony Q Edwards
(74) *Attorney, Agent, or Firm* — Maschoff Brennan (57) ABSTRACT

A rotary shaft and an electronic device having the rotary shaft, the rotary shaft being applied to a foldable electronic device, and the rotary shaft comprising at least one rotary shaft assembly, wherein the rotary shaft assembly comprises: a rotation shaft, a gear sleeved on the rotation shaft, and a first rotating arm, an end of the first rotating arm being fixedly connected to the gear; and a second rotating arm, a first end of the second rotating arm being provided with a rack that engages with the gear. The first rotating arm drives the gear to rotate about the rotation shaft such that a second end of the second rotating arm moves toward a direction away from or close to the rotation shaft.

16 Claims, 8 Drawing Sheets

(56) References Cited

U.S. PATENT DOCUMENTS

| | | | |
|---|---|---|---|
| 2016/0227645 A1* | 8/2016 | Hampton | G06F 1/1616 |
| 2016/0273739 A1* | 9/2016 | Endo | F16M 13/00 |
| 2017/0115701 A1 | 4/2017 | Bae et al. | |
| 2017/0148866 A1* | 5/2017 | Yamazaki | H01L 27/323 |
| 2018/0226001 A1 | 8/2018 | Chen et al. | |
| 2018/0284839 A1 | 10/2018 | Lin | |
| 2019/0274227 A1* | 9/2019 | Hsu | G06F 1/1652 |
| 2020/0329573 A1* | 10/2020 | Huang | G06F 1/1681 |

FOREIGN PATENT DOCUMENTS

| | | |
|---|---|---|
| CN | 205751382 U | 11/2016 |
| CN | 106788536 A | 5/2017 |
| CN | 107831830 A | 3/2018 |
| CN | 107831836 A | 3/2018 |
| CN | 207321314 U | 5/2018 |
| CN | 109270987 A | 1/2019 |
| JP | 2013243588 A | 12/2013 |
| JP | 2018116467 A | 7/2018 |

OTHER PUBLICATIONS

Chinese Office Action dated Dec. 2, 2019 as received in application No. 201810995662.5.
International Search Report and Written Opinion dated Mar. 11, 2021 as received in application No. PCT/CN2019/099233.
Japanese Office Action issued in corresponding application No. 2021-510659, dated Feb. 21, 2022.

* cited by examiner

ROTATING SHAFT AND ELECTRONIC DEVICE HAVING ROTATING SHAFT

CROSS REFERENCE TO RELATED APPLICATIONS

This application is a continuation application of PCT Application No. PCT/CN2019/099233 filed on Aug. 5, 2019, which claims priority to Chinese Patent Application No. 201810995662.5 filed in China on Aug. 29, 2018, disclosures of which are incorporated herein by reference in their entireties.

TECHNICAL FIELD

The present disclosure relates to the technical field of electronic devices, and in particular, to a rotating shaft and an electronic device having the rotating shaft.

BACKGROUND

As electronic devices such as mobile phones and computers are widely popularized and developed, users have increasingly high requirements on sizes of screens of electronic devices. To help increase screens of electronic devices and avoid problems such as electronic devices are inconvenient to carry and occupy large space because of excessively large sizes, foldable flexible screens appear.

As shown in FIG. 1a, FIG. 1b, FIG. 2a, and FIG. 2b, in related art, a first housing 102 and a second housing 103 are disposed on one side of a flexible screen 101, and the first housing 102 and the second housing 103 are connected by using a rotating shaft 104. When the screen of an electronic device needs to be extended to view a video or an ebook or the like, the first housing 102 and the second housing 103 rotate around the rotating shaft 104, to drive the flexible screen 101 to extend and enter an extended state shown in FIG. 2a and FIG. 2b. When the screen of the electronic device needs to be reduced to carry or accommodate the electronic device or the like, the first housing 102 and the second housing 103 rotate around the rotating shaft 104, to drive the flexible screen 101 to bend and enter a folded state shown in FIG. 1A and FIG. 1b. In the folded state, the first housing 102 and the second housing 103 of the electronic device fold, to reduce the size of the electronic device in the folded state and conveniently carry the electronic device.

Figure 1A:
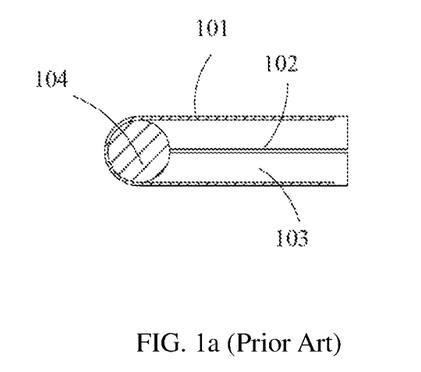
FIG. 1a is a main view of a foldable screen in a folded state in the related art.
Figure 1B:
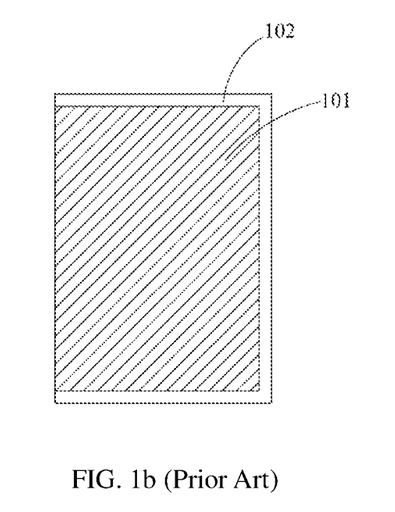
FIG. 1b is a top view of a foldable screen in a folded state in the related art.
Figure 2A:
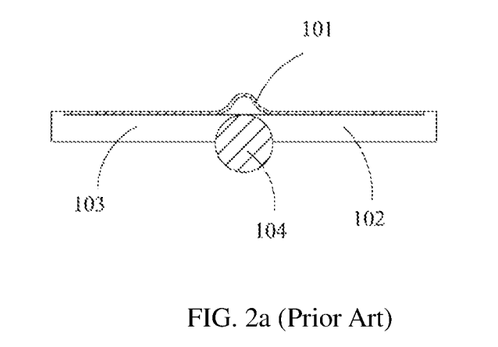
FIG. 2a is a main view of a foldable screen in an extended state in the related art.
Figure 2B:
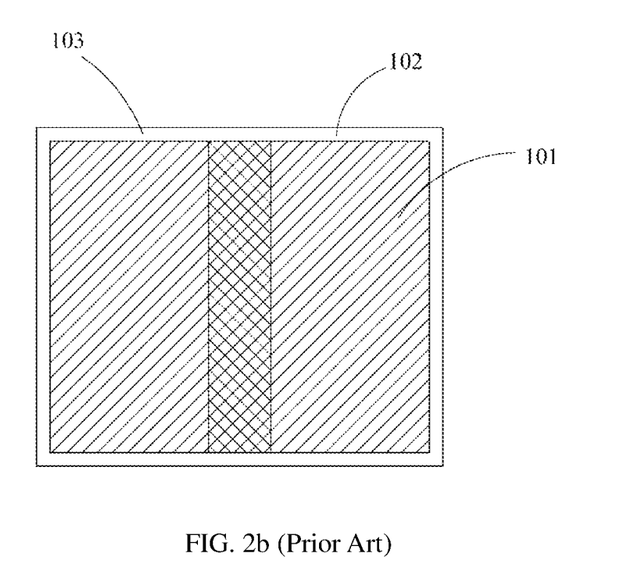
FIG. 2b is a top view of a foldable screen in an extended state in the related art.

However, as shown in FIG. 2a, because a sum of lengths of the first housing 102 and the second housing 103 in a direction perpendicular to a shaft direction of the rotating shaft 104 is reduced in the extended state compared with that in the folded state, the flexible screen 101 generates wrinkles in the extended state. As a result, the flexible screen 101 is less beautiful and the service life of the flexible screen 101 is reduced.

As can be seen, the rotating shaft in the related art has the problem of reducing the service life of the flexible screen.

SUMMARY

According to a first aspect, the embodiments of the present disclosure provide a rotating shaft, applied to a foldable electronic device. The electronic device includes a first housing and a second housing, the rotating shaft includes at least one rotating shaft component, and the rotating shaft component includes:

a rotating bearing;
a gear sleeved on the rotating bearing;
a first rotating arm, where one end of the first rotating arm is fixedly connected to the gear; and
a second rotating arm, where a rack bar meshing with the gear is disposed at a first end of the second rotating arm,
where
the first rotating arm drives the gear to rotate around the rotating bearing, so that a second end of the second rotating arm generates a push-pull force that moves towards a direction away from or close to the rotating bearing.

Optionally, the rack bar is a flexible rack bar, and a portion of the rack bar that meshes with the gear winds on the periphery of the gear.

Optionally, the at least one rotating shaft component includes a first rotating shaft component and a second rotating shaft component; and
the rack bar in the first rotating shaft component winds around the gear in the first rotating shaft component in a first direction, and the rack bar in the second rotating shaft component winds around the gear in the second rotating shaft component in an opposite direction of the first direction.

Optionally, the at least one rotating shaft component includes a third rotating shaft component and a fourth rotating shaft component; and
the rack bar in the third rotating shaft component and the rack bar in the fourth rotating shaft component wind around respective corresponding gears in a same direction.

Optionally, the rotating shaft further includes:
a partition wheel disposed on the rotating bearing and sandwiched between the first rotating shaft component and the second rotating shaft component.

Optionally, the rotating shaft further includes:
a socket, where the socket is provided with a first opening, at least a part of the rack bar is sandwiched between the socket and the gear, and the second rotating arm passes through the first opening and extends out of the socket.

Optionally, the socket is further provided with a second opening, and the first rotating arm passes through the second opening and extends out of the socket, where an opening direction of the second opening is opposite to an opening direction of the first opening.

Optionally, the first rotating arm is fastened at one end of the first rotating arm.

Optionally, the rotating shaft further includes a cap that covers an end portion of the rotating shaft, and the cap includes:
a fastening slot matching an end portion of the socket, and one end of the socket is fastened inside the fastening slot; and
a fastening portion formed by sinking in a direction away from the rotating bearing, where one end that is of the first rotating arm and that is connected to the gear is fastened inside the fastening portion.

According to a second aspect, the embodiments of the present disclosure further provide an electronic device, including a first housing, a second housing, a flexible screen disposed on the first housing and the second housing, and the foregoing rotating shaft. The other end of the first rotating arm is connected to one of the first housing or the second housing, and the second end of the second rotating arm is connected to the other of the first housing or the second housing.

BRIEF DESCRIPTION OF DRAWINGS

To describe the technical solutions of the embodiments of the present disclosure more clearly, the following briefly describes the accompanying drawings required for describing the embodiments or the related art. Apparently, the accompanying drawings in the following description show merely some embodiments of the present disclosure, and a person of ordinary skill in the art may still derive other accompanying drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The rotating shaft provided in the embodiments of the present disclosure may be mounted in a foldable electronic device, to resolve the problem that the flexible screen mounted on the electronic device in the related art generates wrinkles because of extending, thereby increasing the service life of the electronic device and the flexible screen.

Figure 3A:
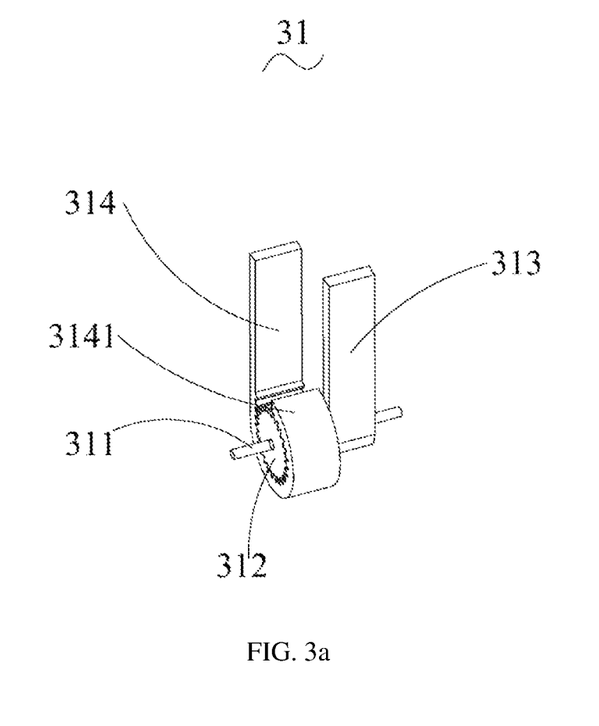
FIG. 3a is a structural diagram of a rotating shaft component in a folded state.
Figure 3B:
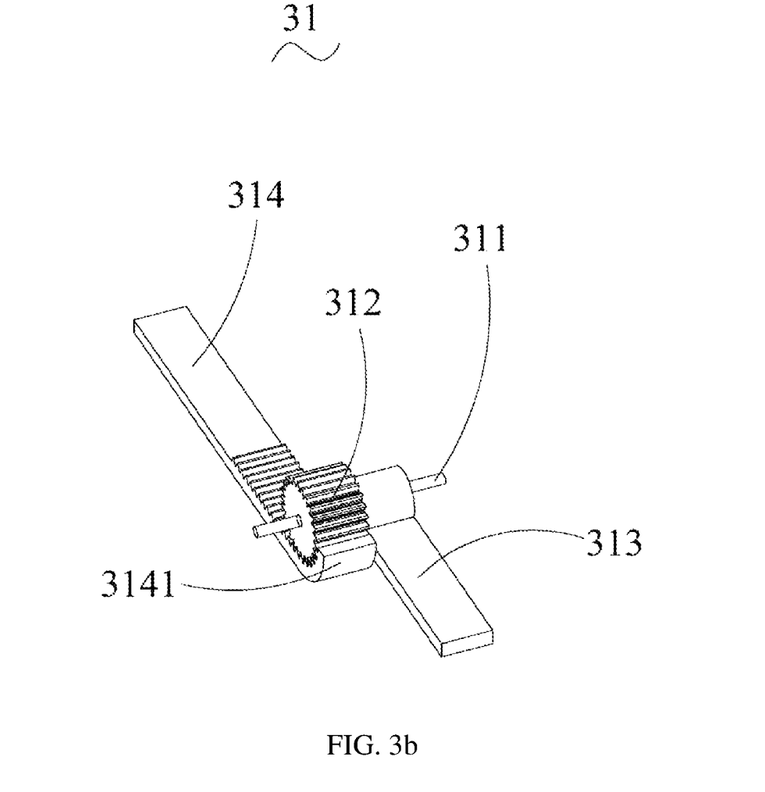
FIG. 3b is a structural diagram of a rotating shaft component in an extended state.

Referring to FIG. 3a and FIG. 3b, the embodiments of the present disclosure provide a rotating shaft, applied to a foldable electronic device. The rotating shaft includes at least one rotating shaft component 31. The rotating shaft component 31 includes a rotating bearing 311, a gear 312 sleeved on the rotating bearing 311, a first rotating arm 313, where one end of the first rotating arm 313 is fixedly connected to the gear 312, and a second rotating arm 314, where a rack bar 3141 meshing with the gear 312 is disposed at a first end of the second rotating arm 314. The first rotating arm 313 drives the gear 312 to rotate around the rotating bearing 311, so that a second end of the second rotating arm 314 moves towards a direction away from or close to the rotating bearing 311.

The second rotating arm 314 extends in a direction perpendicular to the rotating bearing 311.

In a specific application process, the rotating shaft is mounted between a first housing and a second housing of the electronic device. For example, the first housing is fastened on the first rotating arm 313, and the second housing is fastened on the second rotating arm 314. In the folded state shown in FIG. 3a (the first housing and the second housing are not shown in the figure), the first rotating arm 313 and the second rotating arm 314 extend in a same direction, so that the first housing and the second housing fold to reduce the area of the electronic device. In the extended state, the first rotating arm 313 and the second rotating arm 314 extend in an opposite direction driven by the rotating shaft component 31, so that the first housing and the second housing are located on a same horizontal plane, to increase the area of the electronic device.

When the folded state switches to the extended state, the first rotating arm 313 can drive the gear 312 to rotate around the rotating bearing 311 by 90 degrees driven by the first housing, to drive the rack bar 3141 meshing with the gear 312 to move towards a direction of the second end of the second rotating arm 314 (that is, reduce a mesh area of the rack bar 3141 and the gear 312), to increase the length of the second rotating arm 314. Therefore, the second housing is driven to move towards a direction away from the first housing, and this avoids that the flexible screen mounted on the first housing and the second housing generates wrinkles because of extending.

Optionally, the rack bar 3141 is a flexible rack bar, one end that is of the rack bar 3141 and that is close to the gear 312 winds around the periphery of the gear 312 and meshes with the gear 312, and a portion that is of the rack bar 3141 and that does not wind around the periphery of the gear 312 extends in a same direction as that of the second rotating arm 314.

In this way, the flexible rack bar winds around the gear. Compared with a rigid rack bar that extends in a straight line, winding can reduce the length of the rack bar, to reduce space occupied by the rack bar and reduce space occupied by the rotating shaft.

Figure 4:
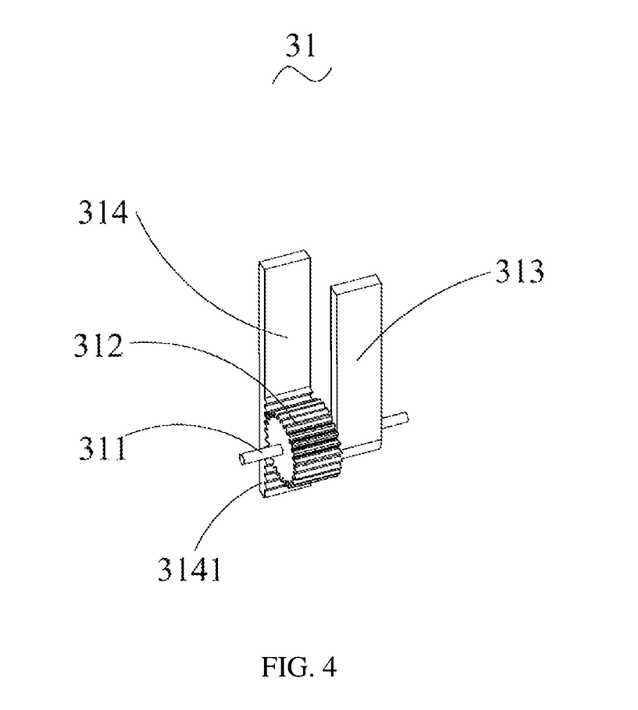
FIG. 4 is a structural diagram of another rotating shaft component in an extended state.
Figure 5:
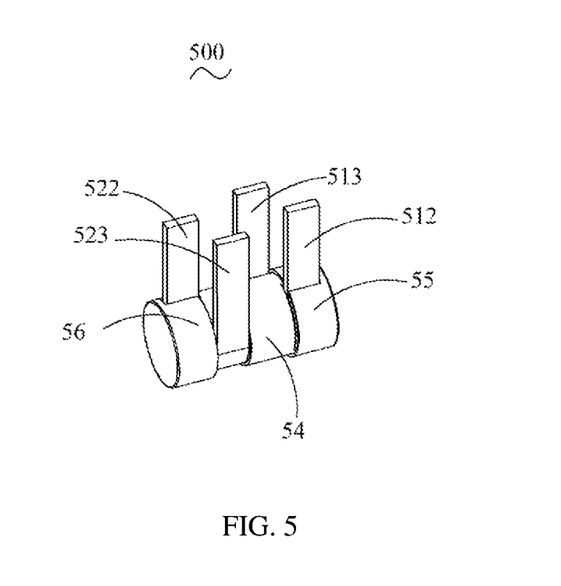
FIG. 5 is a structural diagram of a rotating shaft in a folded state according to an embodiment of this disclosure.

Certainly, the rack bar 3141 may also be a rigid structure in FIG. 4. In the related art, because of the outer diameter of the rotating shaft 104 and the thickness of the housing, when the flexible screen 101 switches from the folded state to the extended state, the length of the flexible screen 101 in a direction perpendicular to the rotating shaft 104 is greater than the width of the electronic device in the direction perpendicular to the rotating shaft 104. Therefore, wrinkles are generated.

As shown in FIG. 4, when the rack bar 3141 is a rigid rack bar, to ensure that the rigid rack bar has sufficient margining so that the second end of the second rotating arm 314 can drive one housing to move towards a direction away from the other housing when the electronic device extends, in the folded state, one end that is of the rigid rack bar and that is away from the second rotating arm 314 may include a protruded end in the direction perpendicular to the rotating shaft 311. The gear 312 meshes between the protruded end of the rack bar 3141 and one end close to the second rotating arm 314. In a process in which the rotating shaft 300 extends to the extended state, the gear 312 rotates and moves to a direction of the protruded end relative to the rack bar 3141, to drive the rigid rack bar to move towards a direction of the second end of the second rotating arm 314. In this way, the second end of the second rotating arm 314 pushes and pulls the housing of the electronic device, to avoid that the flexible screen generates wrinkles.

In addition, a material of the rack bar 3141 may also be an elastic material, so that a meshed portion of the rack bar 3141 and the gear 312 winds around the gear 312 driven by its elastic force. The length by which the rack bar 3141 of the elastic material winds around the periphery of the gear 312 is greater than at least ½ of the perimeter of the gear 312, to keep meshing with the gear 312 driven by the elastic force of the elastic rack bar.

Certainly, a socket may also be disposed on an outer side of the rack bar 3141, to press the flexible rack bar 3141 on the periphery of the gear 312 to mesh with the gear 312.

In addition, as shown in FIG. 3a and FIG. 3b, the first rotating arm 313 is fixedly connected to one end of the gear 312.

Certainly, the first rotating arm 313 may also be fastened on the periphery of the gear 312, and this is not specifically limited herein.

In the embodiments of the present disclosure, the rack bar is disposed on the second rotating arm, so that an extending length of the second rotating arm can be increased or reduced along with rotation of the gear, and the housing can move towards a direction away from or close to the rotating bearing. In this way, when the electronic device extends or folds, a distance between housings is adjustable, so that the flexible screen can always maintain an extended state when extending, to avoid the problem that the flexible screen generates wrinkles when extending.

Referring to FIG. 5 to FIG. 8, the embodiments of the present disclosure provide a rotating shaft 500, including a first rotating shaft component 51 and a second rotating shaft component 52.

Figure 6:
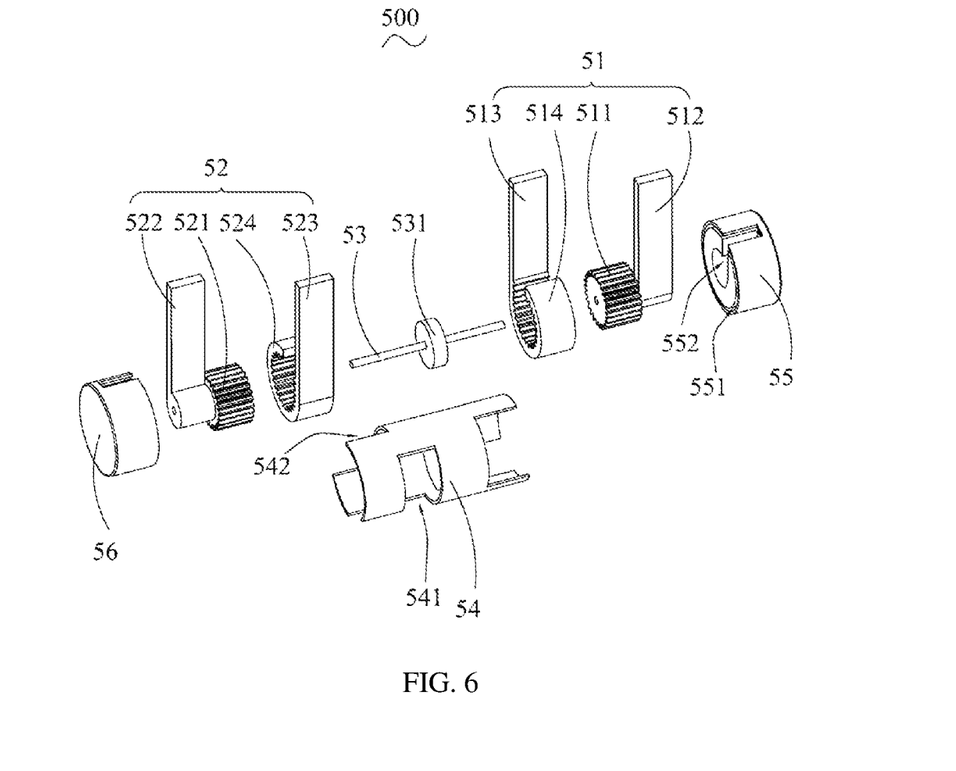
FIG. 6 is an exploded view of the rotating shaft in FIG. 5.
Figure 7:
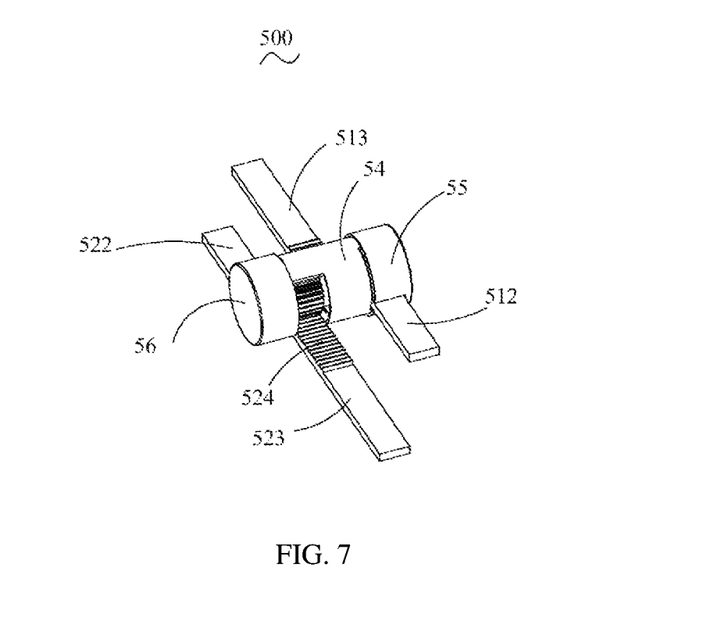
FIG. 7 is a structural diagram of a rotating shaft in an extended state according to an embodiment of this disclosure.
Figure 8:
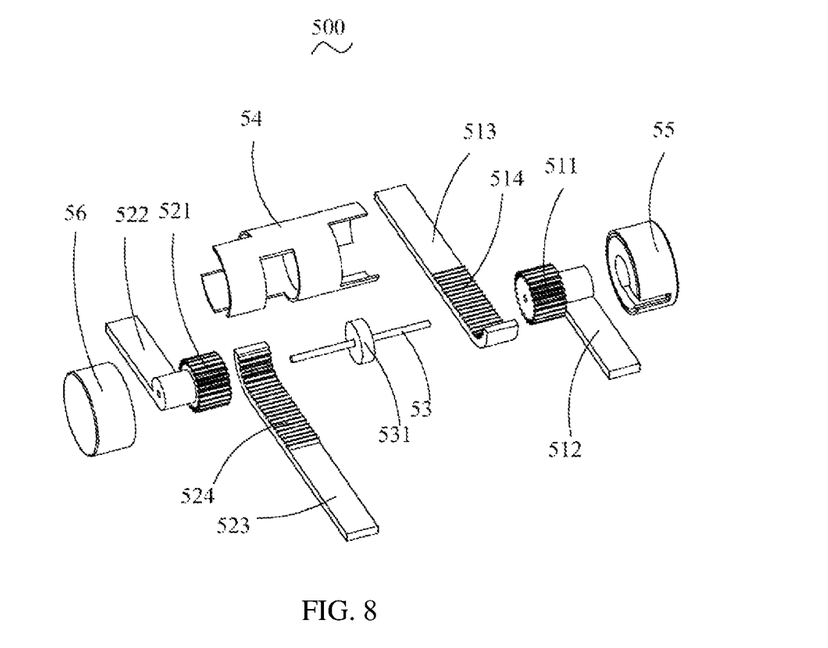
FIG. 8 is an exploded view of the rotating shaft in FIG. 7 in an extended state.

As shown in FIG. 6 and FIG. 7, the first rotating shaft component 51 and the second rotating shaft component 52 have a same structure as that of the rotating shaft component 31 provided in the foregoing embodiment, and the first rotating shaft component 51 and the second rotating shaft component 52 have a same rotating bearing 53.

Specifically, as shown in FIG. 6 and FIG. 7, the first rotating shaft component 51 includes: a first gear 511, a first rotating arm 512 connected to the first gear 511, where the first rotating arm 512 extends perpendicular to an axial direction of the first gear 511, and a second rotating arm 513, where a first rack bar 514 is disposed at a first end of the second rotating arm 513. At least a part of the first rack bar 514 meshes with the first gear 511, and the part that is of the first rack bar 514 and that meshes with the first gear 511 winds around the first gear 511.

As shown in FIG. 6 and FIG. 7, the second rotating shaft component 52 includes: a second gear 521, a third rotating arm 522 connected to the second gear 521, where the third rotating arm 522 is perpendicular to an axial direction of the second gear 521, and a fourth rotating arm 523, where a second rack bar 524 is disposed at a first end of the fourth rotating arm 523. At least a part of the second rack bar 524 meshes with the second gear 521, and a meshed portion of the second rack bar 524 and the second gear 521 winds around the second gear 521.

In addition, a quantity of rotating shaft components included in the rotating shaft 500 is not limited to 2, and may be further any quantity such as 1, 3, or 4. The same or similar beneficial effects can be achieved and are not specifically limited herein.

Figure 9:
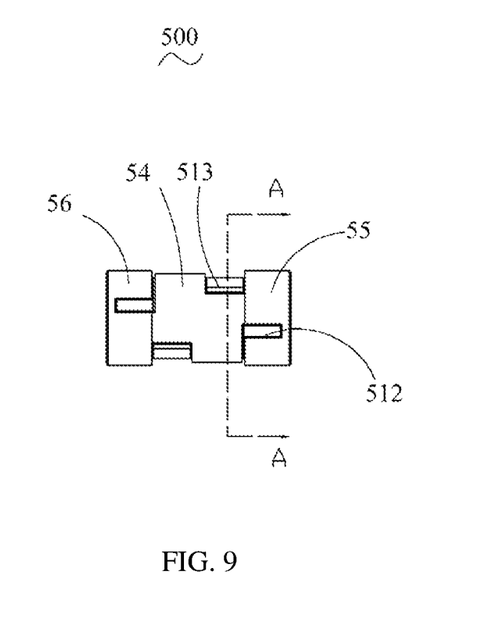
FIG. 9 is a top view of a rotating shaft in a folded state according to an embodiment of this disclosure.
Figure 10:
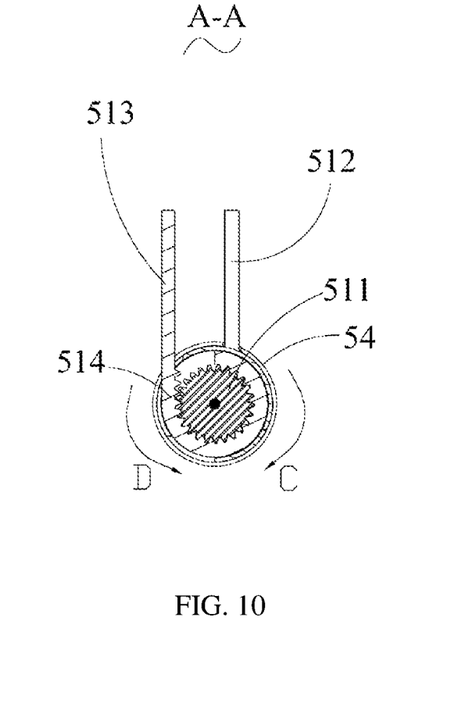
FIG. 10 is a cross-sectional view in an A-A direction in FIG. 9.
Figure 11:
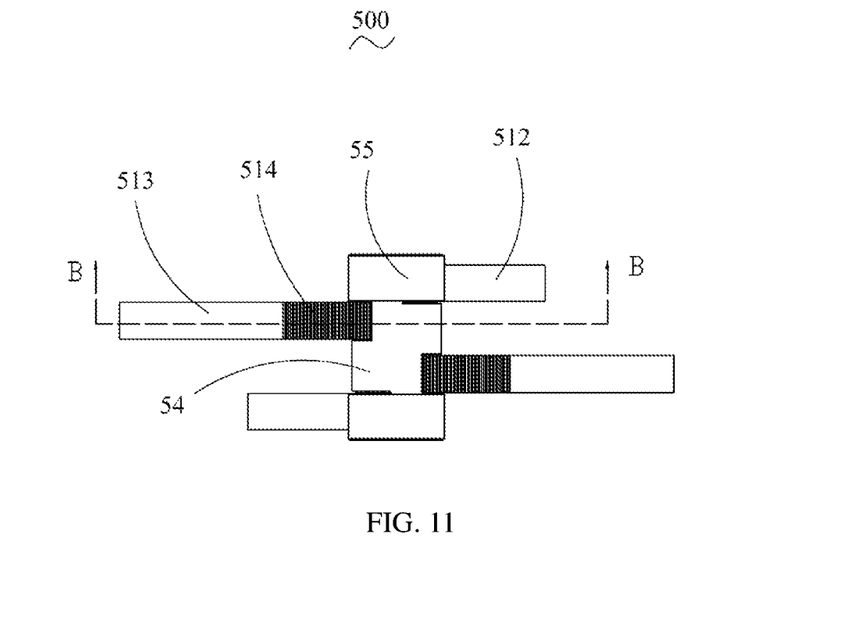
FIG. 11 is a top view of a rotating shaft in an extended state according to an embodiment of this disclosure.
Figure 12:
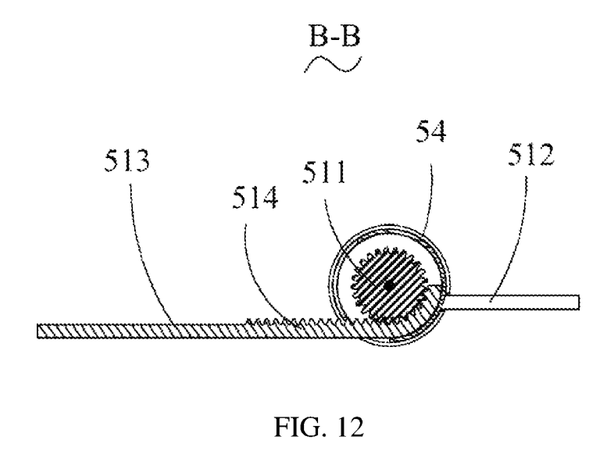
FIG. 12 is a cross-sectional view in a B-B direction in FIG. 11.

In addition, the rotating shaft 500 includes the folded state in FIG. 9 and FIG. 10 and the extended state in FIG. 11 and FIG. 12.

In the folded state in FIG. 9 and FIG. 10, the first rotating arm 512, the second rotating arm 513, the third rotating arm 522, and the fourth rotating arm 523 extend in a same direction.

In this way, in the folded state, this can reduce space occupied by the electronic device on which the rotating shaft is mounted, to conveniently carry and accommodate the electronic device or the like.

In the extended state in FIG. 11 and FIG. 12, the first rotating arm 512 and the fourth rotating arm 523 extend in a same direction, and the second rotating arm 513 and the third rotating arm 522 extend in a same direction. An extending direction of the first rotating arm 512 and the fourth rotating arm 523 is opposite to that of the second rotating arm 513 and the third rotating arm 522.

A direction in which the first rack bar 514 winds around the first gear 513 is opposite to that in which the second rack bar 524 winds around the second gear 521.

In a process of switching from the folded state to the extended state, the first rotating arm 512 rotates by 90 degrees in a first direction C in FIG. 10, and the second rotating arm 513 rotates by 90 degrees in a second direction D, so that the first gear 511 drives the first rack bar 514 meshing with the first gear 511 to extend towards a direction of the second rotating arm 513, to increase the length of the second rotating arm 513. The first direction C and the second direction D are opposite directions.

In this way, the second rotating arm in the first rotating shaft component and the fourth rotating arm in the second rotating shaft component may extend in opposite directions, so that the flexible screen mounted on the electronic device is symmetrically extended towards two opposite sides, to avoid wrinkles generated by the flexible screen and improve the beauty and the service life of the flexible screen.

In addition, in a process in which the second rotating shaft component 52 switches from the folded state to the extended state, the fourth rotating arm 523 is lengthened. A specific lengthening process thereof is the same as that of the second rotating arm 513 in the first rotating shaft component 51, and the first rotating shaft component 51 and the second rotating shaft component 52 synchronously switch between the extended state and the folded state.

Specifically, in the extended state in FIG. 7, the first rotating arm 512 and the fourth rotating arm 523 extend in a same direction, and the second rotating arm 513 and the third rotating arm 522 extend in a same direction. An extending direction of the first rotating arm 512 and the fourth rotating arm 523 is opposite to that of the second rotating arm 513 and the third rotating arm 522.

In this way, in the extended state, the second rotating arm 513 and the fourth rotating arm 523 may be lengthened in opposite directions, so that an extended length of the rotating shaft 500 may be used to stretch wrinkles generated by the flexible screen of the electronic device because of extending. Therefore, the flexible screen is always flat in the extended state, to increase the beauty and the service life of the flexible screen.

Certainly, a direction in which the first rack bar 514 winds around the first gear 513 may be the same as that in which the second rack bar 524 winds around the second gear 521.

In this embodiment, the first housing of the electronic device is fixedly connected to both the second rotating arm 513 and the fourth rotating arm 523, and the second housing is fixedly connected to the first rotating arm 512 and the third rotating arm 522 (not shown in the figure). Therefore, in a process in which the rotating shaft rotates to enter the extended state, the second rotating arm 513 and the fourth rotating arm 523 are connected and extend in a same direction, to jointly drive the first housing of the electronic device to move towards a direction away from the second housing, to avoid that the flexible screen disposed on the first housing and the second housing generates wrinkles because of extending.

In this way, in the extended state, the second rotating arm and the fourth rotating arm may extend in a same direction, so that one housing connected to the second rotating arm and the fourth rotating arm on the electronic device moves towards a direction away from the other housing, to avoid that the flexible screen generates wrinkles.

Optionally, as shown in FIG. 6, the rotating shaft 500 further includes a partition wheel 531 disposed on the rotating bearing 53. Two ends of the rotating bearing 53 separately pass through the first gear 511 and the second gear 521, and the partition wheel 531 is sandwiched between the first gear 511 and the second gear 521.

This reduces frictions generated because the first gear and the second gear rotate in opposite directions. In addition, this can further prevent the first rack bar and the second rack bar from moving towards a direction close to the partition wheel, thereby improving structural reliability of the rotating shaft.

Optionally, as shown in FIG. 6, the rotating shaft 500 further includes a socket 54, where the socket 54 is provided with a first opening 541, at least a part of the second rack bar 524 is sandwiched between the socket 54 and the second gear 521, and the fourth rotating arm 523 passes through the first opening 541 and extends out of the socket 54.

In addition, the socket 54 is further provided with a second opening 542, and the third rotating arm 522 passes through the second opening 542 and extends out of the socket 54, where an opening direction of the second opening 542 is opposite to an opening direction of the first opening 541.

It should be noted that the length of the first opening 541 and the second opening 542 in a direction of the periphery of the socket 54 is greater than at least ¼ of the perimeter of the socket, so that the third rotating arm 522 can rotate by 90° in the second direction D, and the fourth rotating arm 523 can rotate by 90° in the first direction C.

In this way, the socket can be used to make the structure of the rotating shaft more secure and improve the beauty and smoothness of the appearance of the rotating shaft.

It should be noted that the foregoing structure is also applicable to the first rotating shaft component 51. Only the second rotating shaft component 52 is used as an example herein for detailed description and analysis.

Optionally, the first rotating arm 512 is fastened at one end of the first gear 511.

As shown in FIG. 6, this embodiment includes two rotating shaft components, where the partition wheel 531 exists between the first rotating shaft component 51 and the second rotating shaft component 52, and the first rotating arm 512 is fastened at one end that is of the first gear 511 and that is away from the partition wheel 531.

In this way, the first opening 541 and the second opening 542 on the socket 54 may be staggered in the axial direction of the socket 54, thereby increasing structural strength of the socket 54.

It should be noted that the structure of the first rotating shaft component 51 is also applicable to the second rotating shaft component 52. To avoid repetition, only the structure of the first rotating shaft component 51 is specifically analyzed herein.

Optionally, the rotating shaft 500 further includes a first cap 55 that covers an end portion of the rotating shaft 500, and the first cap 55 includes:

a fastening slot 551 matching an end portion of the socket 54, and one end of the socket 54 is fastened inside the fastening slot 551; and a fastening portion 552 formed by sinking in a direction away from the rotating bearing 53, where one end that is of the first rotating arm 512 and that is connected to the first gear 511 is fastened inside the fastening portion 552.

In addition, a second cap 56 having a same structure as that of the first cap 55 is disposed at the other end of the rotating shaft 500, and a structure connected to the socket 54 and the first cap 55 is also applicable to the second cap 56.

Two opposite ends of the rotating bearing 53 separately pass through the first gear 511 and the second gear 521, so that the first gear 511 and the second gear 521 can rotate around the rotating bearing 53.

In addition, the two opposite ends of the rotating bearing 53 separately abut with sides that are of the first cap 55 and the second cap 56 and that are close to the partition wheel 531, so that the first cap 55 and the second cap 56 prevent the rotating bearing 53 from displacing.

In this way, the first cap and the second cap may be connected to two ends of the socket, to prevent the socket from sliding in the axial direction, and prevent the first gear and the second gear from detaching from the socket in the axial direction, so that the structure of the rotating shaft is more reliable.

The embodiments of the present disclosure further provide an electronic device. The electronic device includes a first housing, a second housing, a flexible screen disposed on the first housing and the second housing, and any one of the rotating shafts shown in FIG. 3a to FIG. 12. The first housing and the second housing are connected by using the rotating shaft.

Specifically, when the rotating shaft includes only one rotating shaft component shown in FIG. 3a to FIG. 4, the first housing and the second housing may be fixedly connected to the first rotating arm and the second rotating arm in the rotating shaft component separately.

During extending of the first housing and the second housing, the first rotating arm and the second rotating arm may be driven to be located on a same horizontal plane, and the length of the second rotating arm is raised to increase the distance between the first housing and the second housing, thereby extending the flexible screen and avoid that the flexible screen generates wrinkles.

When the rotating shaft includes the first rotating shaft component and the second rotating shaft component shown in FIG. 5 to FIG. 12, and the rack bars in the two rotating shaft components separately wind around respective corresponding gears in opposite directions, the first housing may be connected to the fourth rotating arm and slidably connected to the first rotating arm, and the second housing is connected to the second rotating arm and is slidably connected to the third rotating arm. This can prevent the first rotating arm and the third rotating arm with the fixed length from obstructing movement of the first housing and the second housing towards a direction away from the rotating shaft or close to the rotating shaft.

When the first housing and the second housing are opened to extend the electronic device, the first rotating arm, the second rotating arm, the third rotating arm, and the fourth rotating arm may be driven to be located on a same horizontal plane, and lengths of the second rotating arm and the fourth rotating arm separately extend towards opposite directions or a same direction, to increase the distance between the first housing and the second housing. In this way, the flexible screen is symmetrically extended along two opposite sides, and wrinkles generated by the flexible screen between the first housing and the second housing are removed.

In the electronic device provided in the embodiments of the present disclosure, the rotating shaft provided in the foregoing embodiment is disposed between the first housing and the second housing, to avoid the defect that the flexible screen mounted on the first housing and the second housing generates wrinkles in the extended state. Therefore, the electronic device is more beautiful and the service life of the electronic device is increased.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A rotating shaft, applied to a foldable electronic device and comprising at least one rotating shaft component, wherein the rotating shaft component comprises:
    a rotating bearing;
    a gear sleeved on the rotating bearing;
    a first rotating arm, where one end of the first rotating arm is fixedly connected to the gear; and
    a second rotating arm, where a rack bar meshing with the gear is disposed at a first end of the second rotating arm, where
    the first rotating arm drives the gear to rotate around the rotating bearing, so that a second end of the second rotating arm moves towards a direction away from or close to the rotating bearing,
    wherein the rack bar is a flexible rack bar, and a portion of the rack bar that meshes with the gear winds on the periphery of the gear.

2. The rotating shaft according to claim 1, wherein the at least one rotating shaft component comprises a first rotating shaft component and a second rotating shaft component; and
    the rack bar in the first rotating shaft component winds around the gear in the first rotating shaft component in a first direction, and the rack bar in the second rotating shaft component winds around the gear in the second rotating shaft component in an opposite direction of the first direction.

3. The rotating shaft according to claim 2, wherein the rotating shaft further comprises:
    a partition wheel disposed on the rotating bearing and sandwiched between the first rotating shaft component and the second rotating shaft component.

4. The rotating shaft according to claim 1, wherein the at least one rotating shaft component comprises a third rotating shaft component and a fourth rotating shaft component; and
    the rack bar in the third rotating shaft component and the rack bar in the fourth rotating shaft component wind around respective corresponding gears in a same direction.

5. The rotating shaft according to claim 1, wherein the rotating shaft further comprises: a socket, where the socket is provided with an opening, at least a part of the rack bar is sandwiched between the socket and the gear, and the second rotating arm passes through the opening and extends out of the socket.

6. The rotating shaft according to claim 5, wherein the socket is further provided with another opening, and the first rotating arm passes through the another opening and extends out of the socket, where an opening direction of the opening is opposite to an opening direction of the another opening.

7. The rotating shaft according to claim 5, wherein the first rotating arm is fastened at one end of the gear.

8. The rotating shaft according to claim 7, wherein the rotating shaft further comprises a cap that covers an end portion of the rotating shaft, and the cap comprises:
    a fastening slot matching an end portion of the socket, and one end of the socket is fastened inside the fastening slot; and
    a fastening portion formed by sinking in a direction away from the rotating bearing, where one end that is of the first rotating arm and that is connected to the gear is fastened inside the fastening portion.

9. An electronic device, comprising a first housing, a second housing, and a flexible screen disposed on the first housing and the second housing, wherein the electronic device further comprises a rotating shaft, the rotating shaft comprises at least one rotating shaft component, wherein the rotating shaft component comprises:
    a rotating bearing;
    a gear sleeved on the rotating bearing;
    a first rotating arm, where one end of the first rotating arm is fixedly connected to the gear; and
    a second rotating arm, where a rack bar meshing with the gear is disposed at a first end of the second rotating arm, where
    the first rotating arm drives the gear to rotate around the rotating bearing, so that a second end of the second rotating arm moves towards a direction away from or close to the rotating bearing,
    the other end of the first rotating arm is connected to one of the first housing or the second housing, and the second end of the second rotating arm is connected to the other of the first housing or the second housing,
    wherein the rack bar is a flexible rack bar, and a portion of the rack bar that meshes with the gear winds on the periphery of the gear.

10. The electronic device according to claim 9, wherein the at least one rotating shaft component comprises a first rotating shaft component and a second rotating shaft component; and
    the rack bar in the first rotating shaft component winds around the gear in the first rotating shaft component in a first direction, and the rack bar in the second rotating shaft component winds around the gear in the second rotating shaft component in an opposite direction of the first direction.

11. The electronic device according to claim 10, wherein the rotating shaft further comprises:
    a partition wheel disposed on the rotating bearing and sandwiched between the first rotating shaft component and the second rotating shaft component.

12. The electronic device according to claim 9, wherein the at least one rotating shaft component comprises a third rotating shaft component and a fourth rotating shaft component; and the rack bar in the third rotating shaft component and the rack bar in the fourth rotating shaft component wind around respective corresponding gears in a same direction.

13. The electronic device according to claim 9, wherein the rotating shaft further comprises: a socket, where the socket is provided with a first opening, at least a part of the rack bar is sandwiched between the socket and the gear, and the second rotating arm passes through the first opening and extends out of the socket.

14. The electronic device according to claim 13, wherein the socket is further provided with a second opening, and the first rotating arm passes through the second opening and extends out of the socket, where an opening direction of the second opening is opposite to an opening direction of the first opening.

15. The electronic device according to claim 13, wherein the first rotating arm is fastened at one end of the gear.

16. The electronic device according to claim 15, wherein the rotating shaft further comprises a cap that covers an end portion of the rotating shaft, and the cap comprises:

a fastening slot matching an end portion of the socket, and one end of the socket is fastened inside the fastening slot; and a fastening portion formed by sinking in a direction away from the rotating bearing, where one end that is of the first rotating arm and that is connected to the gear is fastened inside the fastening portion.

* * * * *